Patented Aug. 14, 1945

2,381,881

UNITED STATES PATENT OFFICE 2,381,881

MIXED ESTERS

Henry S. Rothrock, Wilmington, Del., assignor to E. I. du Pont de Nemours & Company, Wilmington, Del., a corporation of Delaware No Drawing. Application December 30, 1940,
Serial No. 372,392

30 Claims. (Cl. 106—252)

This invention relates to new synthetic drying oils and to coating compositions containing them.

Of the natural drying oils, China wood oil, perilla oil, and oiticica oil are outstanding in their ability to form hard, tack-free, water-resistant films when properly formulated into varnish and enamel compositions. Unfortunately, however, these oils are not produced in this country in substantial quantities and have to be imported. This difficulty is increased by the fact that they are subject to wide fluctuations in price, availability, and quality. Also, as is well known, some of these oils have a tendency to form films that "crystallize" or "frost."

Extensive research has therefore been expended in an effort to develop synthetic compositions which possess the drying properties and film-forming characteristics of these natural drying oils, and in a further endeavor to produce synthetic drying compositions which have even better properties and more uniform quality than the natural drying oils. Such prior attempts, however, have in the main been unsuccessful in producing synthetic drying oils which have properties superior to the natural drying oils, or have been uneconomical in that the materials produced have been so expensive they could have no practical commercial use.

This invention has as its general objective the preparation of new esters which can be substituted for the rapidly drying natural fatty oils in coating compositions into which fatty oils are ordinarily formulated.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acids which will give esters having such properties.

A still further objective is the preparation of esters from those monocarboxylic acids which have the particular types of polyunsaturation, and other elements of chemical structure, which will impart rapid drying film properties to said esters.

Another general objective is the preparation of esters, suitable for use in coating compositions, from acids which are available economically or may be made so readily.

An additional objective is the provision of methods for making these new esters.

The above and other objects appearing hereinafter are accomplished by preparing, for example, by one of the methods subsequently described in detail, a polyhydric alcohol mixed ester, the acidic radicals of which comprise the radical of a $\beta$-furylacrylic acid and the radical of at least one monofunctional monocarboxylic acid of different structure.

The term "monofunctional" means that the monocarboxylic acid contains no group capable of undergoing reaction with the carboxyl group under normal esterification conditions; i. e., acids having an OH, $NH_2$, or NHR group would not be suitable. These different monofunctional monocarboxylic acids are preferably unsaturated, the acids of natural drying or semi-drying oils being most useful.

The expression "a $\beta$-furylacrylic acid" is used in a generic sense to include, not only the specific compound $\beta$-(2-furyl)acrylic acid, but also those acids (wherein the furane ring is attached, preferably at the 2-position, to the beta carbon of the acrylic acid radical) having a substituent on the alpha carbon, or another substituent on the beta carbon, or one or more substituents in the furane ring, or any combination of these. The presence or absence of such substituents does not change the particular sequence of the double bonds, involving the furane ring, which is considered to be the critical element of structure.

In one of the preferred methods of carrying out the invention, a $\beta$-furylacrylic acid is reacted with a polyhydric alcohol which has been partially esterified with a different acid or acids. When these polyhydric alcohol partial esters are glycerol partial esters of a long chain fatty acid, they are most suitably obtained by heating fatty oils in the usual way with glycerol and, preferably, an ester-interchange catalyst. In carrying out this alcoholysis step, the oil and free polyhydric alcohol, in proportions calculated to give the degree of alcoholysis desired, are placed, along with a small amount of alcoholysis catalyst (e. g. 0.01–0.1% of sodium hydroxide based on the oil), in a reactor fitted with an agitator, a device to measure the temperature, and a gas inlet. The mixture is then heated with stirring for 1–2 hours at about 220–225° C., an oxygen-free inert gas such as carbon dioxide or nitrogen being passed into and over the mixture. In the esterification step, this polyhydric alcohol partial ester is cooled to about 140–150° C., and the $\beta$-furylacrylic acid is introduced in approximately the amount sufficient to esterify the free hydroxyl groups calculated to be present from the initial proportions of oil and polyhydric alcohol.

A hydrocarbon solvent, such as xylene, is next added in an amount sufficient to produce boiling when the reaction temperature reaches about 200° C. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. Depending on the temperature of reaction, which in turn is governed by the nature and amount of solvent employed, the reaction can be completed in periods of time ranging from 4-16 hours; thus, when the temperature is around 200° C., the process is usually complete within 11-12 hours. The reaction can be accelerated if desired by means of suitable esterification catalysts. The progress of the reaction can be followed by acid number determinations, the heating being stopped when the acid number reaches or approaches constancy, or whenever desired. There is obtained a viscous solution of the new drying oil from which the solvent can be removed by distillation if desired. The resulting oil, or its solution as obtained in the process, can be formulated, by conventional methods used with natural drying oils, into valuable coating compositions. For such purposes, it can be used alone, or in blends with resins and/or natural drying or semi-drying oils. Hot blending of these new oils with the natural drying or semi-drying oils gives coating composition vehicles of unique properties.

In preparing the esters of the present invention, certain precautions are necessary in order to obtain satisfactory results from a number of standpoints. These precautions are made necessary by the high reactivity of the β-furylacrylic acids, particularly at the elevated temperatures required in the preparation of the esters. As is noted above, and as will be seen from the examples, one such precaution is the maintenance of an inert atmosphere by the use of an oxygen-free inert gas. By complete or essentially complete exclusion of oxygen, superior color is obtained, while, if the reaction is carried out at high temperature in the presence of oxygen, poorer color, combined with decomposition and sometimes inferior drying, is encountered. To obtain light-colored products, it is also necessary to avoid use of materials which liberate oxygen under reaction conditions. Thus, solvents employed should not be those which contain or give off free oxygen or similar active products during the reaction. For example, aged turpentine or old samples of petroleum naphtha should not be used since the peroxides usually present in these materials produce deleterious effects. Other oxygen-yielding compounds, for example, oxidized drying oils, should be excluded in order to insure good color, and to avoid degradation and gelation of the resulting compositions.

The more detailed practice of the invention is illustrated in the following examples wherein the amounts of the ingredients are by weight, such examples being given by way of illustration and not as a limitation. In these examples, viscosities and colors are given on the Gardner-Holdt scale, and the hydroxyl numbers are all corrected for acidity. Where the use of cobalt drier is mentioned, sufficient of a 2% cobalt naphthenate solution is used to give the indicated content of cobalt metal, this proportion being based on oil.

The ester compositions in the titles of each example are an index to the proportion of β-furylacrylic acid radicals in the product; i. e., they do not mean the product actually contains the stated percentages of, for example, the compounds glyceryl trilinoleate or glyceryl tri-(β-furylacrylate). To illustrate, a product referred to as having 40% β-furylacrylic acid glyceride and 60% linseed acids glyceride is a product prepared from proportions of reactants so chosen as to yield a mixture of the two mentioned glycerides in the stated proportions by weight, theoretically, i. e., if it be assumed no mixed esters are formed. Actually, such a product is considered to be composed principally of mixed glycerides, probably mixtures of mixed glycerides, though small amounts of simple glycerides, partial glycerides (i. e., glycerol incompletely esterified), free glycerol, and free acids are undoubtedly present. The significance of the percentages of β-furylacrylic acid glyceride is discussed following the examples.

EXAMPLE 1A

*Glycerol mixed ester of linseed oil acids (2 mols) and β-(2-furyl)acrylic acid (1 mol)—Preparation from β-(2-furyl)acrylic acid*

|   | Per cent |
|---|---|
| β-(2-furyl)acrylic glyceride | 20.4 |
| Linseed acids glyceride | 79.6 |

Alkali-refined linseed oil, 1300 parts, is agitated with 69.4 parts of refined glycerol in an atmosphere of nitrogen at 250° C. for 1.5 hours. To 1010 parts of the diglyceride thus prepared is added 226 parts of β-(2-furyl)acrylic acid (M. P. 140–1° C.) (Gibson and Kahnweiler, Am. Chem. Jour. 12, 314; 1890) and 50 parts of xylene. This mixture is agitated for 12 hours at 215–225° C. under an atmosphere of deoxidized nitrogen. The xylene and water which distil are condensed, the water separated, and the xylene returned to the reactor, these operations being conducted continuously. After removal of solvent and unreacted acid, by holding at 150° C. and 5 mm. pressure for 1 hour, and subsequent filtration, there is obtained an oil, chemical composition as above, having the following physical and analytical values: $N_D^{25}$, 1.4999; $d_4^{25}$, 0.9903; hydroxyl No. 13.8; iodine No. 184.1; saponification No. 216.5; acid No. 6.8; viscosity K; color 4.8.

With 0.03% cobalt, this product dries tack-free over steel and wood in about 8 hours at room temperature to films which are clear, smooth, and glossy, and of excellent flexibility, toughness and hardness. Films having similar properties can be obtained in a shorter time by baking, e. g., at 100° C. On silk or paper, films are likewise excellent.

A black enamel can be prepared by grinding 20 parts of carbon black with 100 parts of the above oil and thinning with 20 parts of mineral spirits. In the presence of 0.03% cobalt drier, this enamel dries overnight to hard, tough, tack-free films, over both bare steel and wood. Baking at elevated temperature (i. e., 100° C.) gives much more rapid set-up.

A typical white enamel can be prepared by grinding in a pebble mill, for 4 days, 22 parts of the above mixed glyceride, 50 parts of titanium dioxide, 50 parts of antimony oxide, and 24 parts of mineral spirits, and blending the grind with 78 additional parts of the mixed glyceride, 20 parts of mineral spirits, and 0.03% cobalt. This enamel dries in 12–14 hours over steel, wood, or other surface to films superior in hardness to those of a control enamel prepared from a 45-gallon China wood oil-limed leaded rosin varnish of viscosity I at 50% solids in mineral spirits. After exposure for 7 months in Florida and Delaware, durability is at least equal to that of the control enamel.

EXAMPLE 1B

*Glycerol mixed ester of linseed oil acids (2 mols) and β-(2-furyl)acrylic acid (1 mol)—Preparation from an ester of β-(2-furyl)acrylic acid*

|  | Per cent |
|---|---|
| β-(2-furyl)acrylic glyceride | 20.4 |
| Linseed acids glyceride | 79.6 |

Forty-five and six-tenths (45.6) parts of methyl β-(2-furyl)acrylate (B. P. 123–123.5° C./30 mm. and obtainable by condensation of furfural with methyl acetate) (in the same manner described by Gilman, Brown & Jones, Chemical Abstracts 22, 4524 (1928) for the corresponding ethyl ester), 154 parts of linseed oil diglyceride, prepared as in Example 1A, 0.2 part of litharge, and 28 parts of toluene are placed in a vessel fitted with a fractionating column and a carbon dioxide inlet. This mixture is heated at 235° C. in an oil bath for 11.5 hours while passing in a slow stream of carbon dioxide, during which period the toluene and methanol pass off as a binary. After removal of unreacted methyl β-(2-furyl)acrylate and any remaining toluene, by heating at 160° C. and 2 mm. pressure for 0.5 hour, there is obtained a clear residual oil, chemical composition as above, having the following physical and analytical values: $N_D^{25}$, 1.5019; $d_4^{25}$, 0.9830; hydroxyl No. 14.8; iodine No. 202; acid No. 1.2; viscosity C; color 5.5.

Clear films over steel, prepared as in Example 1A, have properties similar to those of films of the product obtained as in Example 1A. The products of these two examples appear to be substantially equivalent; thus, in addition to having similar drying and film properties, both mixed glycerides body to a viscosity somewhat above Z–6 upon being heated at 280° C. for about 1 hour.

EXAMPLE 2A

*Glycerol mixed ester of linseed oil acids (1 mol) and β-(2-furyl)acrylic acid (2 mols)—Preparation from β-(2-furyl)acrylic acid*

|  | Per cent |
|---|---|
| β-(2-furyl)acrylic glyceride | 49.4 |
| Linseed acids glyceride | 50.6 |

Alkali-refined linseed oil, 600 parts, 126 parts of glycerol, and 0.6 part of litharge are agitated for 1 hour at 225° C. in an atmosphere of nitrogen. To 85 parts of the resulting monoglyceride are added 73.2 parts of β-(2-furyl)acrylic acid and 18 parts of toluene, and the esterification is carried out as in Example 1A, 9 hours at 210–212° C. being required. After removal of solvent, there is obtained a viscous brown self-drying oil, which is a mixed glyceride of the above-noted chemical composition.

EXAMPLE 2B

*Glycerol mixed ester of linseed oil acids (1 mol) and β-(2-furyl)acrylic acid (2 mols)—Preparation from β-(2-furyl)acrylic acid chloride*

|  | Percent |
|---|---|
| β-(2-furyl)acrylic glyceride | 49.4 |
| Linseed acids glyceride | 50.6 |

To 76 parts of β-(2-furyl)acrylic acid chloride (B. P. 105–8° C./3 mm. and obtainable by reacting β-(2-furyl)acrylic acid with thionyl chloride) are added 83 parts of linseed oil monoglyceride, prepared as in Example 2A, and 450 parts of chloroform. While stirring, passing in nitrogen, and cooling externally, 38.6 parts of pyridine is added slowly. After standing for 1 hour, the mixture is heated at refluxing temperature for another hour. The chloroform solution is then extracted three times with water and once with aqueous sodium carbonate, dried over sodium sulfate, and the chloroform removed by distillation. The residual oily mixed glyceride is very similar chemically and physically to that of Example 2A, as is shown by the following table:

|  | Product of Example 2A | Product of Example 2B |
|---|---|---|
| $N_D^{25}$ | 1.534 | 1.531 |
| $d_4^{25}$ | 1.09 | 1.06 |
| Iodine No. | 193 | 196 |
| Saponification No. | 271 | 278 |
| Acid No. | 18.4 | 8.3 |
| Viscosity | Z–2 | 0 |
| Color | 8 | 6.2 |

The product of Examples 2A and 2B, however made, dries more slowly than the product of Examples 1A and 1B, 2–3 days at 25° C. being required for thorough hardening in the presence of 0.03% cobalt, and gives darker films which show, however, greater hardness and strength.

EXAMPLE 3

*Ethylene glycol mixed ester of linseed oil acids (1 mol) and β-(2-furyl)acrylic acid (1 mol)*

|  | Percent |
|---|---|
| Glycol ester of β-(2-furyl)acrylic acid | 33.9 |
| Glycol ester of linseed oil acids | 66.1 |

Ethylene glycol, 124 parts, is agitated with 560 parts of linseed oil acids for 6 hours at a temperature gradually increasing from 160° C. to 200° C. To 259 parts of this mono-ester are added 116 parts of β-(2-furyl)acrylic acid and 25 parts of toluene. After heating for 8 hours at 170–210° C., other details as before, an oily mixed ester is obtained, chemical composition as above, having the following physical and analytical values: $N_D^{25}$, 1.4992; $d_4^{25}$, 0.9863; hydroxyl No. 7.3; iodine No. 182; saponification No. 234; acid No. 14.7; viscosity C; color 8.5.

The product, in the presence of 0.1% cobalt, dries to hard, glossy films in about 3 days at 25° C. Under the same conditions, the glycol ester of linseed oil acids dries only very slowly to yield soft, tacky, weak films.

EXAMPLE 4

*Hexamethylene glycol mixed ester of linseed oil acids (1 mol) and β-(2-furyl)acrylic acid (1 mol)*

|  | Percent |
|---|---|
| Hexamethylene glycol ester of β-(2-furyl)acrylic acid | 35.8 |
| Hexamethylene glycol ester of linseed oil acids | 64.2 |

To 170 parts of the linseed oil acids half ester of hexamethylene glycol is added 68 parts of β-(2-furyl)acrylic acid and 18 parts of toluene. After esterification (8 hours at 206–219° C.), an oily mixed ester is obtained having the following physical and analytical values: $N_D^{25}$, 1.5010; $d_4^{25}$, 0.9863; hydroxyl No. 11.7; iodine No. 171; saponification No. 220; acid no. 8.5; viscosity E; color 7.4.

With 0.1% cobalt drier, the ester dries tack-free over steel in 3 days at 25° C. Films are glossy, hard, tough, smooth, and outstandingly superior to films from the di-linseed oil acids ester of hexamethylene glycol, which even after 1 week at 25° C. are tacky.

EXAMPLE 5

*Pentaerythritol mixed ester of linseed oil acids (3 mols) and β-(2-furyl)acrylic acid (1 mol)*

| | Percent |
|---|---|
| β-(2-furyl)acrylic tetra-ester of pentaerythritol | 14.8 |
| Linseed acids tetra-ester of pentaerythritol | 85.2 |

Pentaerythritol tri-linseed oil acids ester (hydroxyl No. 51.2) is prepared by agitating 45.3 parts of pentaerythritol (M. P. 253° C.) and 280 parts of linseed oil acids for 4.5 hours at 200° C. in the presence of 25 parts of toluene, the toluene then being removed by heating in vacuo. To 150 parts of this ester are added 25 parts of β-(2-furyl)acrylic acid and 18 parts of toluene, and the mixture agitated for 9.5 hours at 208–214° C. After removal of toluene, the resulting mixed ester has the following physical and analytical values: $N_D^{25}$, 1.4972; $d_4^{25}$, 0.9696; hydroxyl No. 11.1; iodine No. 172; saponification No. 206.8; acid No. 6.9; viscosity K; color 5.2.

With 0.03% cobalt, the product dries over hard surfaces, such as steel, in 8 hours at 25° C. to clear, smooth, hard, and glossy films at least equal to the films from the product of Example 1A (which has a higher proportion of the β-(2-furyl)acrylic glyceride).

EXAMPLE 6

*Complex mixed ester of pentaerythritol (1 mol), glycerol (1 mol), linseed oil acids (5 mols), and β-(2-furyl)acrylic acid (2 mols)*

| | Per cent |
|---|---|
| β-(2-furyl)acrylic glyceride | 7.1 |
| Linseed acids glyceride | 28.2 |
| Pentaerythritol tetra-ester of linseed oil acids | 45.1 |
| β-(2-furyl)acrylic tetra-ester of pentaerythritol | 19.6 |

To 100 parts of the tri-linseed oil acids ester of pentaerythritol, prepared as in Example 5, and 63.6 parts of linseed oil diglyceride, prepared as in Example 1A, are added 31.2 parts of β-(2-furyl)acrylic acid and 18 parts of toluene, the mixture being then heated at 204–214° C. for 6 hours. After removal of toluene by heating in vacuo at 120° C., an oily mixed ester, chemical composition as above, is obtained, having the following physical and analytical values: $N_D^{25}$, 1.4961; $d_4^{25}$, 0.9732; hydroxyl No. 16.9; iodine No. 175; saponification No. 214; acid No. 11.4; viscosity G; color 5.2.

With 0.03% cobalt, this complex mixed ester dries tack-free in 8 hours at 25° C. to films which are clear, smooth, very tough and hard.

EXAMPLE 7

*Glycerol mixed ester of linseed oil acids (2 mols) and α-methyl-β-(2-furyl)acrylic acid (1 mol)*

| | Per cent |
|---|---|
| α-Methyl-β-(2-furyl)acrylic glyceride | 21.9 |
| Linseed acids glyceride | 78.1 |

α-Methyl-β-(2-furyl)acrylic acid (M. P. 111° C., and obtainable by condensing methyl propionate with furfural in the presence of sodium) (Kasiwagi, Bull. Soc. Chim. Japan 2,318 (1927)), 50 parts, is heated with 183 parts of linseed oil diglyceride in the presence of 18 parts of toluene until the acid number of the oil falls to 7.8. Other physical and analytical values are $N_D^{25}$, 1.5023; $d_4^{25}$, 0.9828; hydroxyl No. 10.1; iodine No. 181; saponification No. 229; viscosity E; color 4.4.

The mixed glyceride, chemical composition as above dries slightly slower than the product of Example 1A to films which are hard, glossy, clear, smooth, and tough.

This ester can be made into a varnish by bodying 74 parts in a nitrogen atmosphere at 280° C. for 4.25 hours; adding 21.3 parts of 15% phenolic modified ester gum, 3.2 parts of the unbodied oil, and 0.4 part of hydrated lime; stirring until clear; cooling; and thinning with mineral spirits to viscosity H. This varnish dries over steel or wood in about 5 hours at 25° C., and is otherwise like a similar varnish made with the product of Example 1A.

EXAMPLE 8

*Glycerol mixed ester of benzoic acid (2 mols) and β-(2-furyl)acrylic acid (1 mol)*

| | Per cent |
|---|---|
| β-(2-furyl)acrylic glyceride | 35.9 |
| Benzoic glyceride | 64.1 |

Benzoic diglyceride is prepared by heating with agitation 102 parts of glycerol and 281.4 parts of benzoic acid at 180–210° C. for 9.5 hours, in the presence of 24 parts of toluene, adding 4.5 further parts of glycerol, and heating for another hour at 200° C. β-(2-furyl)acrylic acid, 91 parts, and 24 parts of toluene are next added and the mixture heated as in previous examples for 8.5 hours at 204–220° C. An oily mixed ester, chemical composition as above, is obtained, having the following physical and analytical values: $N_D^{25}$, 1.5797; $d_4^{25}$, 1.2406; hydroxyl No. 17.4; iodine No. 92.5; saponification No. 388; acid No. 22.0; color 5.3.

This ester dries slowly at room temperature (in the presence of 0.03% cobalt) to films which are light-yellow, clear, smooth, and glossy.

A lacquer prepared from equal parts of this ester and nitrocellulose, in butyl acetate, dries rapidly to celar, hard, very tough films.

EXAMPLE 9

*Glycerol mixed ester of soya bean oil acids (2 mols) and β-(2-furyl)acrylic acid (1 mol)*

| | Per cent |
|---|---|
| β-(2-furyl)acrylic glyceride | 20.4 |
| Soya bean acids glyceride | 79.6 |

Alkali-refined soya bean oil, 420 parts, 22.3 parts of refined glycerol, and 0.1 part litharge are agitated in an atmosphere of nitrogen at 225° C. for 1 hour. To the soya oil diglyceride thus prepared are added 108.5 parts of β-(2-furyl)acrylic acid (M. P. 140–1° C.), and 50 parts of xylene. This mixture is heated for 7 hours at 212–218° C. under an atmosphere of deoxidized nitrogen, the solvent which distils being returned to the reactor as in Example 1A. After heating at 150° C. and 5 mm. pressure for 1 hour, and filtering, the mixed glyceride obtained, chemical composition as above, has the following physical and analytical values: $N_D^{25}$, 1.4938; hydroxyl No. 5.8; iodine No. 162.9; acid No. 2.3; viscosity E; color 4.4.

With 0.03% cobalt, this product dries tack-free over steel in 2.5 days at 25° C., the films being clear, smooth, glossy, and hard. Such films are definitely superior in drying rate to those from soya bean oil and slightly superior to those of linseed oil. In hardness and film strength, they are outstandingly superior to these oils after complete drying, and are in general similar to films obtained from China wood oil-limed rosin varnishes of about 45-gallon oil length.

EXAMPLE 10

*Glycerol mixed ester of China wood oil acids (2 mols) and β-(2-furyl) acrylic acid (1 mol)*

| | Per cent |
|---|---|
| β-(2-furyl) acrylic glyceride | 20.4 |
| China wood acids glyceride | 79.6 |

Alkali-refined China wood oil, 220 parts, 11.8 parts of refined glycerol, and 0.2 part of litharge are agitated at 225° C. for 1 hour. To the China wood oil diglyceride thus prepared is added 42.6 parts of β-(2-furyl) acrylic acid (M. P. 140–1° C.) and 30 parts of xylene. This mixture is heated at 215° C. for 2.5 hours under an atmosphere of deoxidized nitrogen, the xylene which distils being condensed and returned to the reactor. After removal of solvent and traces of suspended matter, this mixed glyceride, chemical composition as above, has the following physical and analytical values: $N_D^{25}$, 1.5138; hydroxyl No. 48.7; iodine No. 143.8; saponification No. 189.6; acid No. 26.1; viscosity >Z–6; color 4.3.

With 0.03% cobalt drier, this product dries in about 3 hours at 25° C. over steel, wood, or other surfaces, to films which are clear, smooth, and glossy, show excellent flexibility, toughness, and hardness, and do not exhibit the undesirable characteristic wrinkling of China wood oil films.

EXAMPLE 11

*Mixed furylacrylic glyceride - linseed oil - limed rosin varnish*

A mixed glyceride, prepared as in Example 1A, is bodied to a viscosity of Z–4 to Z–5 by heating under nitrogen at 250° C. for about 4 hours. The bodied oil, 53 parts, and 38.5 parts of bodied linseed oil of viscosity Z–4 are heated for 55 minutes at 250° C. At this point, 17 parts of rosin, 0.5 part of hydrated lime, and 3.8 parts of litharge are added and the heating continued at 250° C. for 2 hours, this being followed by 9 additional parts of rosin and a further 10-minute heating at 240–250° C. The heat is then removed, and 0.5 part of manganese resinate, along with mineral spirits in an amount equal to the total weight of the product, are immediately added. The final varnish is thinned with mineral spirits to a viscosity of E. This varnish dries tack-free in about 7 hours at 25° C., and is in general equal or superior in its properties to a 45-gallon China wood oil/limed-leaded-rosin and 45-gallon perilla oil/ "Amberol" varnishes. In comparison with these controls, durability exposures of this varnish over bare steel, undercoats, or wood, after 7 months in Florida or in Delaware, are definitely much superior, particularly in resistance to checking and cracking, and in general appearance.

EXAMPLE 12

*Mixed furylacrylic glyceride-limed rosin enamel*

To 182.6 parts of the mixed glyceride of Example 1A, which has been bodied by heating under nitrogen at 250° C. for 4.5 hours, are added 34 parts of rosin, 1 part of hydrated lime, and 7.6 parts of litharge. The heating is continued at 250° C. for a further 0.5 hour; 18 parts more of rosin are added, and the resulting mixture is heated for an additional hour at 250° C. To the hot product are added successively 1.1 parts of manganese resinate and about 200 parts of mineral spirits, or whatever quantity is needed for a solution of viscosity of F to G. To 44 parts of this solution are added 50 parts of titanium dioxide, 50 parts of antimony oxide, and 12 parts of mineral spirits, which mixture is ground 4 days in a pebble mill. To the resulting grind are added 64 parts of mineral spirits and 156 parts of the unpigmented solution, whereby there is obtained an enamel suitable for application over wood, metal, etc. It dries faster than a corresponding enamel prepared similarly from a standard 45-gallon China wood oil/limed-leaded rosin varnish, and is much harder and better in through-hardening after an overnight dry. On exposure over bare steel and primers, durability after 7 months in Florida or Delaware is at least equal to the China wood enamel control.

EXAMPLE 13

*Glycerol mixed ester of linseed oil acids and α-cyano-β-(2-furyl) acrylic acid*

| | Percent |
|---|---|
| α-Cyano-β-(2-furyl) acrylic glyceride | 23.1 |
| Linseed acids glyceride | 76.9 |

Linseed oil diglyceride, 61.6 parts, 22 parts of α-cyano-β-(2-furyl) acrylic acid (Chem. Z., 104, II, 372 (1933)), 20 parts of toluene, and 10 parts of benzene are heated together at 150–165° C. for 6 hours in the apparatus previously described. Solvent is removed by distillation, and excess α-cyano-β-(2-furyl) acrylic acid is removed by filtration. This mixed ester, chemical composition as above, has the following physical and analytical values: hydroxyl No. 5.8; acid No. 1.2; viscosity K.

With 0.05% cobalt drier, this product dries within 24 hours at 25° C. to films which are hard and tough.

It will be noted that the above examples have as a part of their caption the amounts of polyhydric alcohol simple esters of each acid that are present in the product theoretically, i. e., if it be assumed no mixed esters are formed. The meaning of these figures has already been discussed. The most generally useful products are those having a β-furylacrylic ester content in the approximate range of 5–40%, this being more generally true with glycerol, β-(2-furyl) acrylic acid, and drying or semi-drying oil acids. Within this 5–40% range, the products most useful as varnishes have about 12–25% β-furylacrylic ester (this again being most generally true with the enumerated ingredients), the approximate peak being at about 20% β-(2-furyl) acrylic glyceride. As the amount is lowered from about 10% toward 0%, the drying time increases, approaching and reaching that of linseed oil. As the amount is raised from about 20% toward 100%, the drying time increases and the dried films become harder. Near and at 100%, the films are excessively brittle. It is to be understood, of course, that mixed esters having a β-furylacrylic ester content outside the range of 5–40% are new and useful, and are a part of this invention.

After the film-forming properties of esters obtained from different proportions of a particular polyhydric alcohol, a β-furylacrylic acid, and other monocarboxylic acid have been determined, as they can easily be by simple testing, it is possible to prepare, by appropriate selection of proportions, a polyhydric alcohol mixed ester having any desired degree of improvement in film-forming properties (up to the maximum possible for the ingredients involved) as compared to the polyhydric alcohol simple ester of the acid other than the β-furylacrylic acid. More specifically, when the polyhydric alcohol is glycerol and the other acid is drying or semi-drying oil acids, it is possible, by appropriate selection of proportions, to prepare a mixed glyceride having any desired degree of improvement in film properties (up to the maximum possible for the ingredients involved) as compared to the drying or semi-drying oil whose acids are being used.

Thus, from soya bean oil, glycerol, and β-(2-furyl)acrylic acid, it is possible to make oils that in drying time and film properties are equal (5–10% β-(2-furyl)acrylic glyceride) or superior (above 10% and up to 25% β-(2-furyl)acrylic glyceride) to linseed oil. In certain formulations, approximately 20% gives equality or superiority to China-wood oil.

Similarly, it is possible to make, from linseed oil, glycerol, and a β-furylacrylic acid, oils which are equal to or better than oils which are superior to linseed oil. For example, a mixed ester having only 5% β-(2-furyl)acrylic glyceride becomes approximately the equal of dehydrated castor oil; one having about 10% β-(2-furyl)acrylic glyceride is like China wood oil in many formulations; and those having more than 10% and up to about 25% β-(2-furyl)acrylic glyceride are superior to China wood oil. At about 20%, the film properties of the oil itself are much superior to those of China wood oil and are even superior in many ways to those of high grade China wood oil varnishes.

In the case of perilla and oiticica oils, which are intermediate in properties between linseed and China wood oils, an introduction of about 2–5% β-(2-furyl)acrylic glyceride makes them the equal of, and more than 5% makes them superior to, China wood oil. A remarkable characteristic of those of the new oils which are in the China wood oil range, or above, is that they dry to clear, smooth films and do not wrinkle or frost as does China wood oil.

The desired proportion of a β-furylacrylic glyceride is normally obtained by using the calculated amount of a β-furylacrylic acid or esterifiable derivative. However, an effect which approaches or equals the behavior of the mixed ester so made can be obtained by preparing a mixed ester of a β-furylacrylic glyceride content higher than that desired, and blending it with the drying oil whose acids are being used (or a different oil if desired) in an amount calculated to give a mixed ester of the desired β-furylacrylic glyceride content. That the blending should, in many instances, produce a product which is better than, not just one of the components, but both of them, is an effect that is very unexpected and unusual, particularly since this result can be obtained under conditions not causing alcoholysis, i. e., blending at ordinary temperature. Better results, however, are usually obtained by blending under conditions probably conductive to some ester interchange, for example, the heating of the two oils, with stirring and in an oxygen-free inert gas atmosphere, for about 0.5 hour at about 200° C.

To illustrate the above effect, the oil of Example 2, which has an ester formula of 49.4% β-(2-furyl)acrylic glyceride and 50.6% linseed acids glyceride, is heated under the conditions just stated with linseed oil in an amount sufficient to reduce the β-(2-furyl)acrylic glyceride content to 20.4%. The resulting blend dries much more rapidly than either the original 49.4% product or the linseed oil, and it appears to be substantially equivalent in properties to the 20.4% product of Example 1. A series of analogous blends, involving treatment of the 49.4% product with various amounts of linseed oil, indicates that drying ability improves with increasing linseed oil content until about a 10% β-(2-furyl)acrylic glyceride content is reached, beyond which the rate decreases. The color of the dried films improves and hardness decreases with increasing linseed oil content. Similiar results are obtained with cold-blending of the 49.4% product and the linseed oil, although somewhat better drying and film properties are usually obtained when heat-blending is employed.

The mixed esters of the present invention can be made by reacting the polyhydric alcohol with a β-furylacrylic acid of an esterifiable derivative and with the other monocarboxylic acid or acids or esterifiable derivative, simultaneously or successively in any order, suitable esterifiable derivatives in both instances being the anhydride, an acid halide, or an ester with an alcohol more volatile than the polyhydric alcohol whose ester is being prepared. Or a polyhydric alcohol simple ester of any of the monocarboxylic acids may be reacted successively with additional polyhydric alcohol and the remaining acid or acids, in the first (alcoholysis) step of which process an ester interchange catalyst, such as litharge, sodium hydroxide, sodium glycerolate, etc., is preferably included in small amount, suitably from 0.01% to 1.0%. In certain cases, it is possible, even desirable, to react together with stirring, at about 200–225° C., the β-furylacrylic acid, glycerol, and the polyhydric alcohol ester of the other monocarboxylic acid. As catalysts, sodium acid sulfate, sodium dihydrogen phosphate, and the like can be employed if desired.

Solvents and other preparative details should be adjusted to the method chosen, the manner of so doing being apparent to one skilled in the art. When the solution method is to be used, any inert liquid which dissolves the product is suitable, hydrocarbons being preferable, and the amount of solvent can be varied as desired. Suitable specific solvents include toluene, xylene, cymene, amylbenzene, tetrachloroethane, anisol, and cyclohexanone. Aromatic hydrocarbons, chlorinated solvents, ethers, and ketones are suitable in general. A boiling point in the range 100–200° C. is desirable. The process of the invention can also be carried out in the absence of a solvent.

Other polyhydric alcohols which can be used include diethylene glycol, decamethylene glycol, cyclohexyl-1,2-dicarbinol methyltrimethylolmethane, erythritol, sorbitol, and p,p'-di(2-hydroxyethyl)benzene. Best results are obtained with alcohols having more than two alcohol groups.

The monofunctional monocarboxylic acid or acids of different structure than the β-furylacrylic acid can be any monofunctional monocarboxylic acid of different structure, or any mixture of such acids, such as mixtures of linseed and China wood oil acids. Other specific acids that are suitable include cotton seed oil acids, coconut oil acids, corn oil acids, furoic acid, sorbic acid, quinolinic acid, alpha-naphthionic acid, crotonic acid, oleic acid, stearic acid, phenoxyacetic acid, and the like. The acid can be aromatic or aliphatic; open or closed chain, and, if the latter, monocyclic, polycyclic, homocyclic, or heterocyclic; saturated or unsaturated; straight or branched chain; and substituted or not by other groups or atoms, such as ether, ketone, halogen, etc., which do not interfere with the esterification reaction.

Any β-furylacrylic acid, as the term has been defined herein, can be used. In addition to those of the examples, other suitable acids, and one suitable source for each, are as follows:

| Acid | Source |
| --- | --- |
| α,β-di-(2-furyl)acrylic | Reaction of furfural and methyl ester of 2-furylacetic acid |
| α-phenyl-β-(2-furyl)acrylic | Reaction of furfural and methyl ester of phenylacetic acid |
| α,β-dimethyl-β-(2-furyl)acrylic | Reaction of methyl furyl ketone with methyl α-bromopropionate, followed by dehydration |
| β-cyclohexyl-β-(2-furyl)acrylic | Reaction of cyclohexyl furyl ketone with methyl α-bromoacetate, followed by dehydration |
| β-(3-furyl)acrylic | Reaction of 3-aldehydrofurane with acetic anhydride and sodium acetate |
| β-[2-(5-methylfuryl)]acrylic | Reaction of acetic anhydride and sodium acetate with 5-methylfurfural |
| β-[2-(5-chlorofuryl)]acrylic | Reaction of acetic anhydride and sodium acetate with 5-chlorofurfural |

In addition to the particular coating compositions of the examples, the present esters can be formulated into any other desired type of paint, varnish, lacquer, or enamel. Thus, they can be blended by conventional methods with other varnish gums, such as copal, kauri, ester gum, oil-soluble phenol-formaldehyde resins, and rosin-extended phenol-formaldehyde resins, such as "Amberols"; with other resins, such as vinyl or urea-formaldehyde types; with cellulose derivatives, such as nitrocellulose, ethyl cellulose, cellulose acetate-propionate, etc.; with auxiliary components of all kinds, such as waxes, solvents, pigments, plasticizers, and the like, as needed and desired; and to particular advantage with fatty oils, especially drying or semi-drying oils, as is explained above.

The products of this invention can be applied, and air-dried or baked, as first, intermediate, or finish coats, over any kind of surface, such as metal, wood, glass, stone, cloth, paper, rubber, cellulose, etc., which is capable of being coated by other types of coating compositions. They can be used in the manufacture of linoleum, in conjunction with fillers and other added agents. They are of value in the manufacture of oil-cloth, oil silk, sandpaper and other abrasive products, and the like.

The preferred esters of this invention are light-colored oils which resemble outwardly the natural drying oils, and which, in their film properties, are in general comparable to well-known commercial products, e. g., China wood oil varnishes of about 50-gallon oil length. They can be blown or heat-bodied in a manner quite similar to the natural drying oils, and they react toward driers in a manner generally similar to linseed oil. Driers and solvents which are effective with natural drying oils work well with the new oils, although, if very light-colored products are to be made, lead compounds are undesirable and should be used sparingly if at all. This is particularly true in the preparation of the oils, and in general in any application where the oil is heated with lead. Properly formulated compositions compare favorably with the best China wood oil varnishes and other well-known types of coatings, and, among other advantages, permit higher build with a given number of coats because of the higher solids content at working viscosity.

In general, the present application describes new and useful synthetic drying oils which can be produced economically, and which possess in many instances properties that are a definite improvement over those of the best-known natural drying oils when formulated into varnishes, enamels, and coatings generally. Furthermore, by incorporating limited amounts of these new esters with the slower drying natural oils, such as linseed oil, it is possible to produce compositions which dry at least as well as the best natural drying oil, viz., China wood oil.

It is apparent that many widely different embodiments of this invention may be made without departing from the spirit and scope thereof; and, therefore, it is not intended to be limited except as indicated in the appended claims.

I claim:

1. A polyhydric alcohol mixed ester of a β-furylacrylic acid and a monofunctional monocarboxylic acid of different structure.

2. A glycerol mixed ester of a β-furylacrylic acid and a monofunctional monocarboxylic acid of different structure.

3. A polyhydric alcohol mixed ester of a β-furylacrylic acid and the acids of a fatty oil.

4. A polyhydric alcohol mixed ester of a β-furylacrylic acid and the acids of a natural drying oil.

5. A polyhydric alcohol mixed ester of a β-furylacrylic acid and linseed oil acids.

6. A polyhydric alcohol mixed ester of β-(2-furyl)acrylic acid and the acids of a fatty oil.

7. A polyhydric alcohol mixed ester of β-(2-furyl)acrylic acid and the acids of a natural drying oil.

8. A polyhydric alcohol mixed ester of β-(2-furyl)acrylic acid and linseed oil acids.

9. A glycerol mixed ester of β-(2-furyl)acrylic acid and natural drying oil acids containing that proportion of β-(2-furyl)acrylic acid radicals which theoretically gives a content of glycerol simple ester of that acid in the range of about 5–40% by weight.

10. A glycerol mixed ester of β-(2-furyl)acrylic acid and natural drying oil acids containing that proportion of β-(2-furyl)acrylic acid radicals which theoretically gives a content of glycerol simple ester of that acid in the range of about 12–25% by weight.

11. A glycerol mixed ester of β-(2-furyl)acrylic acid and linseed oil acids containing that proportion of β-(2-furyl)acrylic acid radicals which theoretically gives a content of about 20% by weight of β-(2-furyl)acrylic glyceride.

12. A coating composition containing the product of claim 1.

13. A coating composition containing the product of claim 1 and a drying fatty oil.

14. A varnish containing the product of claim 1, a drier, and a varnish solvent.

15. A varnish containing the product of claim 1, a drying oil, a drier, and a varnish solvent.

16. A varnish containing a glycerol mixed ester of β-(2-furyl)acrylic acid and the acids of a natural drying oil, a drier, and a varnish solvent.

17. An enamel containing the product of claim 1, a pigment, a drier, and a volatile solvent.

18. An enamel containing a glycerol mixed ester of β-(2-furyl)acrylic acid and the acids of a natural drying oil, a pigment, a drier, and a volatile solvent.

19. The method which comprises reacting a polyhydric alcohol with a β-furylacrylic acid and at least one monofunctional monocarboxylic acid of different structure.

20. The method which comprises reacting a polyhydric alcohol with a β-furylacrylic acid and the acids of a fatty oil.

21. The method which comprises reacting a polyhydric alcohol with a β-furylacrylic acid and the acids of a natural drying oil.

22. The method which comprises reacting a polyhydric alcohol with a β-furylacrylic acid and the acids of a plurality of drying oils.

23. The method which comprises heating a natural fatty oil and a polyhydric alcohol, and esterifying the resulting product with a β-furylacrylic acid.

24. The method which comprises reacting a β-furylacrylic acid with a polyhydric alcohol partial ester of drying oil acids.

25. The method which comprises reacting a polyhydric alcohol with a β-furylacrylic acid and at least one monofunctional monocarboxylic acid of different structure, and blending the resulting product with a drying oil.

26. The method which comprises reacting a β-furylacrylic acid and a polyhydric alcohol partially esterified with at least one monofunctional monocarboxylic acid of different structure, and blending the resulting product with a drying oil.

27. The method which comprises reacting a β-furylacrylic acid and a polyhydric alcohol partially esterified with at least one monofunctional monocarboxylic acid of different structure, and blending the resulting product with a drying oil by heating the two oils in an inert gas atmosphere for about 0.5 hour at about 200° C.

28. The method of making improved drying oils which comprises blending a drying oil with a polyhydric alcohol mixed ester of a β-furylacrylic acid and a monofunctional monocarboxylic acid of different structure.

29. The method of improving the drying of linseed oil which comprises blending it with a glycerol mixed ester of a β-furylacrylic acid and linseed oil acids.

30. The method of producing a drying oil having better drying properties than China-wood oil, which comprises blending linseed oil with a glycerol mixed ester of β-(2-furyl)acrylic acid and linseed oil acids containing that proportion of β-(2-furyl)acrylic acid radicals which theoretically gives a content of more than 10% and up to about 25% of β-(2-furyl)acrylic glyceride.

HENRY S. ROTHROCK.

---

CERTIFICATE OF CORRECTION.

Patent No. 2,381,881.             August 14, 1945.

HENRY S. ROTHROCK.

It is hereby certified that error appears in the printed specification of the above numbered patent requiring correction as follows: Page 2, second column, line 40, for "vylene" read --xylene--; page 6, first column, line 67, for "conductive" read --conducive--; and that the said Letters Patent should be read with this correction therein that the same may conform to the record of the case in the Patent Office.

Signed and sealed this 25th day of December, A. D. 1945.

Leslie Frazer (Seal)             First Assistant Commissioner of Patents.

19. The method which comprises reacting a polyhydric alcohol with a β-furylacrylic acid and at least one monofunctional monocarboxylic acid of different structure.

20. The method which comprises reacting a polyhydric alcohol with a β-furylacrylic acid and the acids of a fatty oil.

21. The method which comprises reacting a polyhydric alcohol with a β-furylacrylic acid and the acids of a natural drying oil.

22. The method which comprises reacting a polyhydric alcohol with a β-furylacrylic acid and the acids of a plurality of drying oils.

23. The method which comprises heating a natural fatty oil and a polyhydric alcohol, and esterifying the resulting product with a β-furylacrylic acid.

24. The method which comprises reacting a β-furylacrylic acid with a polyhydric alcohol partial ester of drying oil acids.

25. The method which comprises reacting a polyhydric alcohol with a β-furylacrylic acid and at least one monofunctional monocarboxylic acid of different structure, and blending the resulting product with a drying oil.

26. The method which comprises reacting a β-furylacrylic acid and a polyhydric alcohol partially esterified with at least one monofunctional monocarboxylic acid of different structure, and blending the resulting product with a drying oil.

27. The method which comprises reacting a β-furylacrylic acid and a polyhydric alcohol partially esterified with at least one monofunctional monocarboxylic acid of different structure, and blending the resulting product with a drying oil by heating the two oils in an inert gas atmosphere for about 0.5 hour at about 200° C.

28. The method of making improved drying oils which comprises blending a drying oil with a polyhydric alcohol mixed ester of a β-furylacrylic acid and a monofunctional monocarboxylic acid of different structure.

29. The method of improving the drying of linseed oil which comprises blending it with a glycerol mixed ester of a β-furylacrylic acid and linseed oil acids.

30. The method of producing a drying oil having better drying properties than China-wood oil, which comprises blending linseed oil with a glycerol mixed ester of β-(2-furyl)acrylic acid and linseed oil acids containing that proportion of β-(2-furyl)acrylic acid radicals which theoretically gives a content of more than 10% and up to about 25% of β-(2-furyl)acrylic glyceride.

HENRY S. ROTHROCK.

CERTIFICATE OF CORRECTION.

Patent No. 2,381,881.  August 14, 1945.

HENRY S. ROTHROCK.

It is hereby certified that error appears in the printed specification of the above numbered patent requiring correction as follows: Page 2, second column, line 40, for "vylene" read --xylene--; page 6, first column, line 67, for "conductive" read --conducive--; and that the said Letters Patent should be read with this correction therein that the same may conform to the record of the case in the Patent Office.

Signed and sealed this 25th day of December, A. D. 1945.

Leslie Frazer (Seal)  First Assistant Commissioner of Patents.